United States Patent
Hodge

(10) Patent No.: US 7,539,973 B2
(45) Date of Patent: May 26, 2009

(54) OBJECT TYPE-DECLARATION PREFIX SYNTAX

(76) Inventor: Bruce Hodge, 54 Wilton Rd., Greenfield, NY (US) 12833

( * ) Notice: Subject to any disclaimer, the term of this patent is extended or adjusted under 35 U.S.C. 154(b) by 236 days.

(21) Appl. No.: 11/144,266

(22) Filed: Jun. 3, 2005

(65) Prior Publication Data

US 2005/0278697 A1 Dec. 15, 2005

Related U.S. Application Data

(63) Continuation-in-part of application No. 09/583,672, filed on May 31, 2000, now abandoned.

(60) Provisional application No. 60/136,957, filed on Jun. 1, 1999.

(51) Int. Cl.
*G06F 9/44* (2006.01)

(52) U.S. Cl. .................... 717/115; 717/142; 717/148

(58) Field of Classification Search ................. 717/115, 717/142, 148
See application file for complete search history.

(56) References Cited

U.S. PATENT DOCUMENTS

| | | | | |
|---|---|---|---|---|
| 5,708,811 | A * | 1/1998 | Arendt et al. ............... | 717/163 |
| 5,905,498 | A | 5/1999 | Diament | |
| 6,678,745 | B1 * | 1/2004 | Hodge .......................... | 719/331 |
| 6,704,746 | B2 * | 3/2004 | Sokolov et al. ............ | 707/103 R |
| 6,715,141 | B1 * | 3/2004 | Hodge ......................... | 717/139 |

OTHER PUBLICATIONS

Erich Gamma et al., "Design Patterns: Elements of Reusable Object-Oriented Software," Addison-Wesley, 1995, pp. iii, iv, 107-116.*
Angelo Corsaro et al., "Virtual Component: a Design Pattern for Memory-Constrained Embedded Applications," Proceedings of the 9th Annual Conference on the Pattern Languages of Programs, Monticello, Illinois, Sep. 2002, 13 pages.*
T. Berners-Lee et al., "Uniform Resource Identifiers (URI): Generic Syntax," [online] Aug. 1998, <URL: http://www.ietf.org/rfc/rfc2396.txt>, pp. 1-40.
Roger Jack, "Top Ten ASP Tips," Jan. 1998, Microsoft Interactive Developer, [online] 1998, <URL: http://www.microsoft.com/mind/0198/asptips/asptips.asp>, pp. 1-7.
Ebbe Jonsson, "Key Systems program design principles; Variable and control naming," [online] Sep. 9, 1996, <URL: http://shs.ssh.fi/-ebbe/keysys/coding.htm>, pp. 1-7.
J.J. Kuslich, "Writing Database Applications with Enterprise Server 3.0; Part II: Strategies & Techniques," [online] Mar. 1998, <URL: http://developer.netscape.com/viewsource/kuslich_es302.html>, pp. 1-10.

(Continued)

*Primary Examiner*—Eric B Kiss
(74) *Attorney, Agent, or Firm*—Blanche E. Schiller, Esq.; Heslin Rothenberg Farley & Mesiti P.C.

(57) ABSTRACT

A programming language syntax that embeds object type declaration in the object name. The objects are self-documenting because its object type is embedded in each object. In one embodiment, the object type-declaration prefix precedes the object name and explicitly declares the object type information. For example, a SQL object FirstName, may be implemented as SQL@FirstName, a URL object may be implemented as URL@FirstName, environment object from an environment table may be implemented as ENV@user.

31 Claims, 11 Drawing Sheets

Block Diagram of OTDPS Interpreter

OTHER PUBLICATIONS

"Microsoft Visual Basic 5.0 Programmer's Guide," 1997, Microsoft Press, pp. 847-857.

Charles Simonyi, "Programmer Identifier Naming Convention," [online] Feb. 16, 1997, <URL: http://web.archive.org/web/19970216094411/http://www.strangecreations.com/library/c/naming.txt>, pp. 1-15.

James Gosling and Henry McGilton, "The Java Language Environment, A White Paper," [online] May 1996, <URL: http://java.sun.com/docs/white/langenv/index.html>, pp. 1-85.

Konstantin Knizhnik, "New products available," [online], <URL: http://www.garret.ru/~knizhnik/whatsnew.html>, pp. 1-21.

Konstantin Knizhnik, "connect.h," Jul. 1999, <URL: http://web.archive.org/web/20010404064113/http://www.ispras.ru/~knizhnik/oodbc-1.03.tar.gz>, pp. 1-2.

Konstantin Knizhnik, "cursor.h," Jul. 1999, <URL: http://web.archive.org/web/20010404064113/http://www.ispras.ru/~knizhnik/oodbc-1.03.tar.gz>, pp. 1-3.

Konstantin Knizhnik, "query.h," Jul. 1999, <URL: http://web.archive.org/web/20010404064113/http://www.ispras.ru/~knizhnik/oodbc-1.03.tar.gz>, pp. 1-7.

Konstantin Knizhnik, "readme.htm," Sep. 1999, <URL: http://web.archive.org/web/20010404064113/http://www.ispras.ru/~knizhnik/oodbc-1.03.tar.gz>, pp. 1-6.

Andrew C. Staugaard, Jr., "Structured and Object-Oriented Techniques, An Introduction Using C++," 1997, Prentice-Hall, Inc., pp. iii, iv, xv-xxxiii, 33-34, 54-65, 564-565.

Samuel R. Blackburn, "WTC—CExtensibleMarkupLanguageElement," [online] Sep. 1998, <URL: http://web.archive.org/web/19981203090032/http://ourworld.compuserve.com/homepages/sam_blackburn/CXMLE.htm>, pp. 1-7.

Breck Carter, "Tip 85: Java in the Database (5) I/O," [online] Dec. 1998, <URL: http://www.bcarter.com/tip085.htm>, pp. 1-7.

"DynaPage Breif Synopsis," [online] 1998, <URL: http://web.archive.org/web/19980206145820/www.hodgepodge.com/DynaPage.html>, p. 1.

"DynaScript Cod Example," [online] 1998, <URL: http://web.archive.org/web/19980206145820/http://www.hodgepodge.com/DynaPageExample.html>, pp. 1-3.

Andrew C. Staugaard, Jr., "Structured and Object-Oriented Techniques, An Introduction Using C++," 1997, Prentice-Hall, Inc., pp. 470-487.

* cited by examiner

Object Type Declaration Prefix Syntax

```
                 101                    103
       102
<%

Conn$ClientDB.connect("DSN=ClientDSN;UID=webuser;PWD=admin"
);
         104     105

Cursor$Clients = Conn$ClientDB.prepare("select FirstName,
LastName, Phone from ClientDb where zip = URL$Zip");
while (Cursor$Clients.fetch())  110              106   107
{ print ("Name = ",DB$FirstName," ",DB$LastName," Phone =
", Cursor$Clients.Phone,"\n");
}                                          108   109
%>
```

Figure 1

Syntactic Validation During Assignment

```
                    ╱201
SQL$Cmd = "select FirstName, LastName, Phone from ClientDb
where zip = URL$Zip";
Cursor$Clients = Conn$ClientDB.prepare(SQL$Cmd);
```

Figure 2

OTDPS on a BREW Enabled Cell Phone

```
<% // Shows enhancements to BREW® interfaces like auto-
centering menu title
list$mainList('Enter New Symbol', 'Price', 'Min/Max',          ←——— 401
'Change', 'Volume','All');
// The List constructor accepts a comma delimited list
menu$mainMenu.SetTitle(url$Symbol.toUpper(),'CENTER');
// Uppercase symbol and center menu title                      ←——— 402
menu$mainMenu.AddItem(list$mainList);  ←
// Intelligent late binding of data at runtime 403
menu$mainMenu.SetSel(url$MenuOpt);  ←————————————————— 404
// Preset Menu option
menu$mainMenu.HandleEvent(sub$getSelection());  ←——————— 405
// bind a subroutine to menu control for event handling
menu$mainMenu.SetActive(TRUE);  ←
// Activate control
                                                               ——— 406
sub$getSelection()  ←
{ switch(menu$mainMenu.EventIndex)  ←——————————————— 407
// trap event and execute appropriate script
    { case 0 :                                                  408
DML$DML("AutoLoad.dml?Symbol=url$Symbol");break;  ←——— 409
//DML objects cause scripts to be loaded and executed
       case 1 : DML$DML("Price.dml?Symbol=url$Symbol");break;
       case 2 : DML$DML("MinMax.dml?Symbol=url$Symbol");break;
       case 3 : DML$DML("Change.dml?Symbol=url$Symbol");break;
       case 4 : DML$DML("Volume.dml?Symbol=url$Symbol");break;
       case 5 : DML$DML("All.dml?Symbol=url$Symbol");break;
       default : return false;
    }
}
%>
```

Figure 4

OTDPS Dynamic Late Binding Example

```
<% // Demonstrates intelligent objects and ability to
handle async i/o interfaces seemlessly.
    // Shows how DynaScript dataflow technology is intuitive
and straight forward
    // Also shows how easy it is to extract data from      601
objects                                                    602
    xml$StockInfo.schema("YahooFinance.xsd");
xml$StockInfo.bind(http$http.get("http://finance.yahoo.com/
d/quotes.csv?s=url$Symbol&f=sl1d1t1c1ohgv&e=.csv"));
%>                                                         603
<center>
<b>url$Symbol</b><br>
<a href="Menu.dml?MenuOpt=5&Symbol=url$Symbol">Done</a><br>
</center>
Price: <b>xml$StockInfo.Price</b><br>
Date: <b>xml$StockInfo.Date</b><br>                        604
Time: <b>xml$StockInfo.Time</b><br>
Change: <b>xml$StockInfo.Change</b><br>
Open: <b>xml$StockInfo.Open</b><br>
Min: <b>xml$StockInfo.Min</b><br>
Max: <b>xml$StockInfo.Max</b><br>
Volume: <b>xml$StockInfo.Volume</b><br>
```

Figure 6

YahooFinance.xsd

```xml
<?xml version="1.0" encoding="UTF-8" ?>
<schema xmlns="http://www.w3.org/2001/XMLSchema"
elementFormDefault="qualified">
  <sequence>
    <element name="Symbol" type="string" minOccurs="1" maxOccurs="1" />
    <element name="Price" type="string" minOccurs="1" maxOccurs="1" />
    <element name="Date" type="string" minOccurs="1" maxOccurs="1" />
    <element name="Time" type="string" minOccurs="1" maxOccurs="1" />
    <element name="Change" type="string" minOccurs="1" maxOccurs="1" />
    <element name="Open" type="string" minOccurs="1" maxOccurs="1" />
    <element name="Max" type="string" minOccurs="1" maxOccurs="1" />
    <element name="Min" type="string" minOccurs="1" maxOccurs="1" />
    <element name="Volume" type="string" minOccurs="1" maxOccurs="1" />
  </sequence>
</schema>
```

Figure 7

Single Connection Single Cursor Mode Example

```
connect("DSN=Greenfield;UID=webuser;PWD=admin");    901 select tax_desc from tax_info where tax_id = ?;//Free SQL
Statement example
bindParam(SQL_param_input,URL$TaxId,SQL_varchar);
                                                    902
fetch();
print("Your Being Taxed because %s\n",DB$tax_desc);
```

Figure 9

Nested Cursor Example

```
CONN$Greenfield.connect("DSN=Greenfield;UID=webuser;PWD=adm
in");

if(!CONN$Greenfield.connected){ print( "Unable to connect
go Greenfield\n" );end;}
CURSOR$TaxId = CONN$Greenfield.prepare("select tax_id from
tax_payer order by tax_id");
CURSOR$TaxCnt = CONN$Greenfield.prepare("select sum(paid)
as paid from tax_list where id = 'DB$tax_id'");

var$cnt=0;
while(CURSOR$TaxId.fetch())
{ var$cnt++;
  print( "%d Tax Id = %s ",var$cnt,DB$tax_id.substr(0,10)
);
  CURSOR$TaxCnt.fetch();
  print( "Amount = %3.2f\n",DB$paid);
}
```

Figure 10

Multiple Cursor Data Access Example

```
CONN$Greenfield.connect("DSN=Greenfield;UID=webuser;PWD=adm
in");

if(!CONN$Greenfield.connected){ print( "Unable to connect
go Greenfield\n" );end;}
CURSOR$owner = CONN$Greenfield.prepare("select name from
owners");
CURSOR$address = CONN$Greenfield.prepare("select name,
city, state, zip from address where owner =
'CURSOR$owner.name'");

while(CURSOR$owner.fetch())                              1101
{ print("Owner = %s\n",CURSOR$owner.name);
   CURSOR$address.fetch();                               1102
   print( "Owner = %s, Address = %s %s,%d\n",
CURSOR$owner.name, CURSOR$address.name, DB$city, DB$state,
DB$zip);
}
```

Figure 11

OBJECT TYPE-DECLARATION PREFIX SYNTAX

CROSS-REFERENCE TO RELATED APPLICATIONS

This application is a continuation-in-part of application Ser. No. 09/583,672, filed May 31, 2000, which claims the benefit of provisional application No. 60/136,957 entitled DYNAMIC OBJECT SYNTHESIS WITH AUTOMATIC LATE BINDING, filed on Jun. 1, 1999. This application is also related to U.S. Pat. No. 6,678,745 entitled DYNAMIC OBJECT SYNTHESIS WITH AUTOMATIC LATE BINDING, issued on Jan. 13, 2004 and U.S. Pat. No. 6,715,141 entitled MULTIPHASE SINGLE PASS INTERPRETER issued on Mar. 30, 2004. Application Ser. Nos. 09/583,672, 60/136,957 and U.S. Pat. Nos. 6,678,745 and 6,715,141 are incorporated herein in their entirety by reference.

TECHNICAL FIELD OF THE INVENTION

The present invention relates generally to computer programming language and particularly, to system and method of declaring object type information in a programming language.

BACKGROUND OF THE INVENTION

The currently available scripting languages for manipulating application systems such as databases are typically resource-intensive and require a good amount of time to learn before they can be used. Accordingly, there is a need for a programming language syntax that is simpler and yet efficiently covers many of what developers need to create high-end interactive applications.

SUMMARY OF THE INVENTION

A system and method of the present invention in an exemplary embodiment is directed to a programming language syntax that embeds object type declaration in the object name. The objects are self-documenting because its object type is embedded in each object. By only examining the object names, therefore, methods associated with the object can be easily determined without resorting to the class definition for the object. Consequently, the language syntax in one embodiment of the present invention enables interpreters to process objects in an intelligent manner. For example, interpreters do not have to refer back to additional information or additional files having information about the objects because the object type is embedded in each object. Not accessing additional files or memory locations can greatly improve speed and efficiency of an interpreter.

With such language syntax, programmers or writers of programming code need not explicitly declare variables. Consequently, the number of lines of code typically required in software code is reduced thereby reducing the time to develop and implement software code. Reduced lines of code also means less memory space required to store the code. The present invention in one embodiment, therefore, can operate with much less memory or disk space than is required by the existing conventional programming languages. Because a programmer need not declare explicitly each variable type before using the variables, developing software code becomes faster and easier.

Moreover, because the type-declarations are embedded with the object names, thereby rendering the objects self-contained, the code including type declaration of the present invention in one embodiment can be easily embedded and/or ported into a code of another language, for example, hyper-text markup language ("HTML"). The present invention in one embodiment can also be easily integrated into an interactive development environment ("IDE") such as VISUAL BASIC and JAVA Symantic Cafe. The present invention in one embodiment also enables programmers and/or developers to easily identify and isolate errors by visual inspection, thereby enhancing greater ease in debugging code.

In one embodiment, the object type-declaration prefix precedes the object name and explicitly declares the object type information. For example, a Database object FirstName, may be implemented as DB$FirstName, a URL object may be implemented as URL$LastName, and environment object from an environment table may be implemented as ENV$Remote_User.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

FIG. 1 shows object names having object type-declaration syntax of the present invention in one embodiment.

FIG. 2 is an example of how OTDPS is used and parsed in one embodiment.

FIG. 4 shows OTDPS implemented on a BREW® enabled cell phone.

FIG. 6 illustrates an example use of OTDPS XML object.

FIG. 7 shows an example of the XML schema file loaded into the XML object of FIG. 6.

FIG. 9 illustrates an example of a code using OTDPS abbreviated syntax for single cursor mode.

FIG. 10 illustrates an example of code using nested multiple cursors.

FIG. 11 illustrates an example of code using the multiple cursors that have the same name fields.

DETAILED DESCRIPTION OF THE INVENTION

Figure 3:
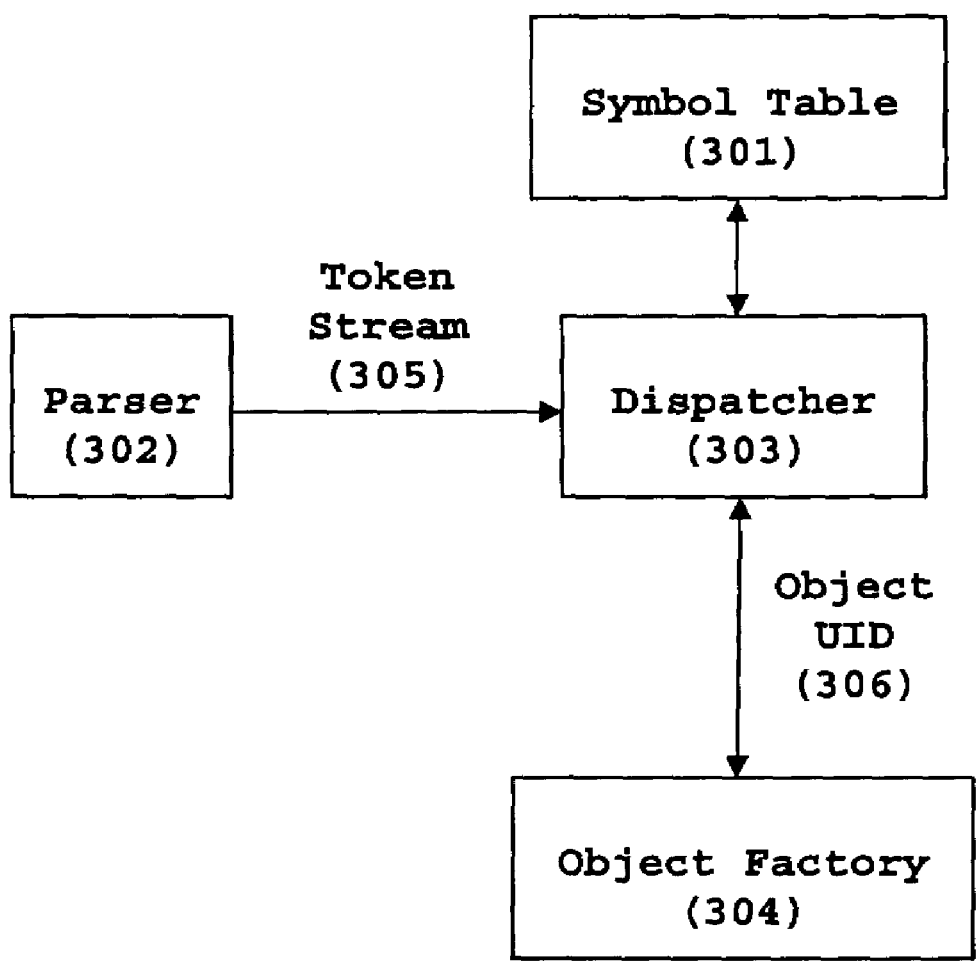
FIG. 3 shows a block diagram of how the OTDPS interpreter works in one embodiment.

An exemplary embodiment of the present invention is directed to a programming language syntax that embeds object type declaration in the object symbol. The objects are self-documenting because its object type is embedded in each object. In one embodiment, the object type-declaration prefix precedes the object name and explicitly declares the object type information. FIG. 1 shows object symbols having object type-declaration syntax of the present invention in one embodiment. 101 shows connection object named ClientDB implemented as Conn$ClientDB by concatenating the object type Conn 102 with object name ClientDB 103. A joint attribute or delimiter may be a $ symbol 104. Similarly, a URL object may be implemented as URL$Zip by concatenating the object type URL 106 with object name Zip 107. The DB object LastName, may be implemented as DB$LastName by concatenating the object type DB 108 with object name LastName 109.

In FIG. 1, a person of ordinary skill will appreciate that a developer is able to recognize specific methods applied to particular objects. For example, a cursor object may be created using a connection object's prepare method 105. Conn$ prefix before the ClientDB right away shows that ClientDB is a Connection type object. This example illustrates how a method associated with an object can be called instantly in a program by declaring the object type at the same time as the method call. Similarly, without the Cursor$ syntax specified in the cursor object name, it would be difficult to know to call the fetch method 110 associated with the cursor object in order to retrieve the selected data from the database. Further, the DB$ syntax specified in front of the FirstName and LastName represents that the data returned from the cursor$Clients fetch method is to be binded accordingly and displayed.

Since the data being fetched is in a single, non-nested fetch loop DB prefix can be used to refer to the data returned by the cursor directly. If there is one cursor or multiple cursors with no similar field names in any of their respective select queries then the developer can access the information directly through the DB object. If there are field names similar in multiple cursors and they are nested within each other the DB object will reflect the most recently fetched value. For example, in FIG. 11, if one were to replace the print statement 1101 with print("Owner=%s\n",DB$name) and print statement 1102 with print("Owner=%s, Address=%s%s,%d\n", DB$name, CURSOR$address.name, DB$city, DB$state, DB$zip); print statement 1102 would have DB$name replaced with the address from the CURSOR$address. fetch( ) command and not contain the owner name from the previously executed CURSOR$owner.fetch( ). In one embodiment, the DB object supplies an intuitive and simple interface to SQL cursor data for simple queries. In this embodiment, the returned data can be referred to explicitly by using the cursor name prefix, Cursor$Clients.<SQLFieldName>. For example, the above command may alternately be print(Cursor$Clients.FirstName, Cursor$Clients.LastName, Cursor$Clients.Phone). This is useful when using nested fetches and you have like <SQLFieldNames>.

Because OTDPS has the object type associated with each object embedded in the object symbol a user can perform operations on it at parse time that cannot be done with any other type of language. For example, in FIG. 1 at 105, a user can syntactically validate the SQL query being submitted by the Conn$ClientDB.prepare method prior to storing the query in the symbol table and actually executing the prepare method. A user can assign the SQL query to a SQL object and OTDPS interpreter can syntactically validate the SQL statement as it is parsing the SQL object because OTDPS allows the interpreter to know right away that the object is an SQL object. For instance, once the object type is determined from the syntax of the statement, the OTDPS interpreter can load up the symantic rules that correspond to the determined object type and perform the syntax validation against those rules. The same goes for other objects like XML, HTTP, URL etc. Each one of these protocol objects can perform syntactic validation prior to writing to the symbol table. In one embodiment, various symantic rules (and any other information and files) associated with various object types and protocol types, for example, can be packaged with an OTDPS interpreter. In another embodiment, the rules and any associated information or files associated with various object types or protocols can be dynamically loaded from appropriate locations.

FIG. 2 is an example of how OTDPS is used and parsed in one embodiment. The OTDPS interpreter, for example, validates the syntax during the assignment of the SQL query to the SQL$Cmd object 201. The OTDPS interpreter will see that object's type is SQL and therefore automatically validate the syntax against the valid SQL syntax validation rules. Also since the connection object prepare method is used to parse SQL the connection semantic rule set allows either a SQL literal string or an SQL object to be supplied as a parameter.

FIG. 3 shows a block diagram of how the OTDPS interpreter works in one embodiment. The OTDPS interpreter reads a line of code that is written using OTDPS and right away sees, for instance, when parsing the statement, the object type associated with an object or variable. Since the interpreter knows the type of object it has parsed, the parser 302 can send a token stream 305 to a dispatcher 303 that contains embedded object type information. Without OTDPS this cannot be done. The dispatcher 303 now knows the type of object it is processing without having to refer to the symbol table and can perform multiple type specific operations on that token or token stream.

For example, on a statement shown in FIG. 2, the dispatcher 303 can syntactically validate the literal string (SQL statement) prior to writing it in the symbol table 301. Generally, a person of ordinary skill in the art of software technology will appreciate that an object factory (also referred to as abstract factory or concrete factory) is a well-known methodology for creating objects. The dispatcher 303 can also, without having to reference the symbol table, pass the token to the object factory 304 for object creation or in another embodiment, the dispatcher 303 could create a flyweight or stand-in object and set attributes in the flyweight for later instantiation (lazy instantiation). By performing lazy instantiation the dispatcher 303 can perform program optimization by instantiating objects only when needed and not necessarily when coded. For instance, the dispatcher 303 could manipulate resources of the system independent of the program execution sequence so that the program as a whole would execute in a more efficient manner. For example, consider a program that requires an asynchronous I/O operation and that resource is not ready at parse time. If the results of that I/O are not needed until later in the program, the parser 302 could spin off a thread to handle the asynchronous I/O and continue parsing. The actual object creation needed to process that I/O operation could be delayed while other objects needed further down the code are being created. In sum, the dispatcher 303 could optimize internal processing or P-Code execution based on current system resource consumption not on program sequence. Known computer programming languages must refer to a symbol table in order to determine what type of object they are processing. With the syntax disclosed in the present invention in one embodiment, interpreters need not refer to a symbol table to determine an objects type. It is already embedded in the parser's token stream 305 saving processing time.

If, for example, when the statement in FIG. 6 at 601 is parsed by the OTDPS interpreter prior to storing the Stockinfo ID in the symbol table, the OTDPS interpreter could send the object factory (FIG. 3 304) an XML Unique Identifier (UID) or key 306 and the Object factory would load the expat XML parser and return to the dispatcher 303 an expat XML parser pointer or expat XML object reference. The dispatcher would then store in the symbol table the StockInfo ID and bind it to that expat XML parser pointer. After receiving the schema method token from the OTDPS parser 302, the dispatcher 303 calls the XML parser load schema method, which automatically causes the XML parser to load "YahooFinance.xsd" file.

For a type sensitive syntactic validation example, a SQL object is illustrated. The statement SQL$query="select name from client where zip=12833"; when parsed by the OTDPS interpreter would perform a SQL syntactic validation test on the literal "select name from client where zip=12833 ", write the query ID into the symbol table and bind it to the literal. This can only be done with OTDPS. A standard non OTDPS interpreter would simply bind the query ID to the literal in the symbol table because it would not know that the literal was an SQL query. Another aspect of OTDPS is that with OTDPS there is significantly less symbol table lookups and therefore faster code processing time.

Examples of the language command set that includes the type declaration syntax of the present invention in one embodiment are described herein below in greater detail.

1. Syntax

<%
<OTDPS Code>
%>

These markers delineate OTDPS code within an HTML document. This can occur more than once in a document, wherever dynamic content is needed.

/* multi-line comment */

All text between these markers are treated as a comment.

//<single line comment>

All text following this marker is treated as a comment up to the end of the line.

2. Literals

| numbers | 1, 2.3, .444444, 5.6789e+12, 0777, 0x12df |
|---|---|
| strings | 'string"A"', "B string=john's name", |
| escape | \b, \f, \n, \r, \" |
| boolean | true, false |
| null | |

3. Variables

Variables have this format:
    <type>$<identifying name>

There are several basic types of variables used, and they are easily identified by their prefix (i.e., var$Cnt, URL$Name, DB$Phone, . . . ).

Figure 5:
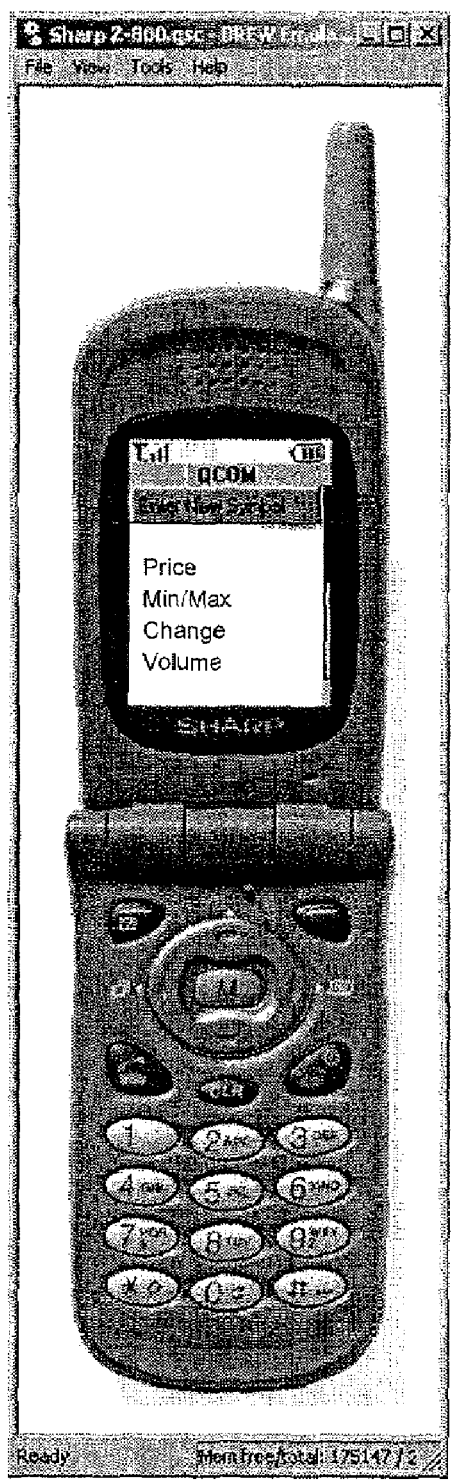
FIG. 5 shows the results displayed on the cell phone of the code shown in FIG. 4.

The present invention in one embodiment includes multiple types of classes or variables. Automatic classes are objects that are automatically created. They come into existence when first given a value, either through an assignment or function call. The code shown in FIG. 4 illustrates this characteristic in one embodiment of the present invention. This code that uses the OTDPS of the present invention interacts with BREW® interface for programming cellular phones (FIG. 5). The OTDPS interpreter in one embodiment communicates with the BREW® layer and performs all required initialization as well as resource management. For example when the OTDPS interpreter loads, it automatically creates a BREW® shell from which it then builds an applet layer. When a menu object is created the object factory 304 communicates with the BREW® layer and requests a BREW_MENUCTRL interface that is used to communicate with the cell phone's menuing system. In another embodiment, a similar OTDPS interpreter could be created to run on J2ME or JAVA based device. One could have the OTDPS interpreter ported to Microsoft CE or palm OS PDA devices as well.

FIG. 4 at 402 shows a menu object's SetTitle method being called on the mainMenu menu object. Note that the main-Menu object has no constructor statement prior to this method call. This is an automatic or dynamic class object that instantiates itself through a lazy constructor method. When an object method is called or a property assigned, the dispatcher 303 can submit the object UID to the object factory 304 and have an object of that type created. Here, in one embodiment, because the menu object method SetTitle is being called, the object will be instantiated with default values set on all properties and the Title property and mode will be initialized to the supplied parameters. Unlike other known languages, using OTDPS allows programmers or developers to use this feature because one has to know what type an object is at the time the method is being called. In this case, the interpreter knows that it is a menu object by the embedded type information and for this particular cell phone the SetTitle method has a default value of left justified and an optional secondary parameter of "Centered" to override the left justification and center the title above the menu on the cell phone. Because the menu object type is known at parse time the dispatcher does not necessarily have to instantiate the object at parse time right then and there. It can assess whether to instantiate the object or delay instantiation to some later time. A semantic rule can be associated with each object and force the dispatcher to reschedule instantiation to some other time.

For example, in FIG. 4, the menu object does not have to be instantiated at statement 402. It is not even visible on the cell phone display until it is activated 406. So the dispatcher could have an associate semantic rule that requires the menu object to be stored in a flyweight or stand-in object until the activate method is called. This reduces resource consumption and object creation time making the interpreter more efficient. 401 shows a list constructor used to hold the list of symbols used for each button on the menu. Note that the constructor does not use the Object function call in order to instantiate the object. Again using the lazy constructor method, objects can be instantiated without having to explicitly declare the constructor. The interpreter knows how to parse and create the object because its type is declared right in the object symbol itself. List$mainlist object knows that either a comma or tab delimited list is semantically allowed, therefore, list$main-List("Enter New Symbol\tPrice\tMin/Max\tChange\tVolume\tAll"), would work as well. The "\t" represents a tab character and in this case forms a tab delimited list within the supplied literal string. The statement at 403 shows the menu object AddItem method being called. This method expects a list object or a comma/tab delimited literal shown above.

An aspect of one embodiment of OTDPS is that object names can be reused. For instance, one could have another mainList object in the same program and there would not be a conflict in names as long and they are of different types. The type & symbol name are hashed together to form a unique index into the OTDPS interpreter symbol table. The OTDPS interpreter in one embodiment uses a factory instantiater that creates objects. For example:

var$mainList="Enter New Symbol\tPrice\tMin/Max\tChange\tVolume\tAll");"

could be located in the same program and menu$mainMenu.AddItem(var$mainList);

would work as well. This feature allows for an extremely versatile program generated type language. OTDPS can be easily generated by a GUI front end or code generator and duplicate symbol names could be generated as long as unique types were assigned to each duplicated symbol name. In OTDPS states need not be maintained. The syntax is forgiving because it does not require an explicit creator. Therefore, OTDPS creation and destruction is implicit. One can jump right into any section of code without having to initialize all variables. No matter where the path of execution leads, variables will always be initialized to a default state. This allows the programmer to concentrate on what is important and let the rest default to a stable known state. The OTDPS object factory 304 can delay creation and optimize on the fly. Because there is no specific object creator with the automatic or dynamic objects, the dispatcher 303 can determine when to actually create the object.

The statement at 404 presets a menu object selection. In that statement, url$MenuOpt represents a URL variable that contains an option selection number returned from the getSelection subroutine 407 causing the menu to preselect the option supplied. The statement at 405 binds the menu event handler to the getSelection subroutine 407 so that when a button on the menu is selected the getSelection subroutine will be called. The statement at 406 causes the OTDPS object factory 304 to create and activate the menu control. Note that the menu object was not necessarily instantiated once its first method was called. Because the menu is not active at statement 402 the object factory 304 may store all attributes or properties in a flyweight or stand-in structure and only manufacture the object once the SetActive method 406 is called. Because the OTDPS allows this lazy construction or initialization the interpreter can optimize resources, sequencing of actual program execution and object creation. This provides for an asynchronous scheduling of object creation. In one embodiment the OTDPS interpreter may perform speculative branching on decisions and queue up both cases. One would have code that due to branching is never reached and the resources for that non-branched code would never be created nor consume resources. The OTDPS object factory 304 would not instantiate and implement objects if not used. The statement at 408 shows that inside the getSelection subroutine the menu$mainMenu.EventIndex is used to switch on. The EventIndex property will be set to the button number, 0=first button, 1=second button . . . , selected on the menu causing the switch to select the appropriate program to load. For example if the second button "Price" was selected menu$mainMenu.EventIndex would be set to 1 and the Price.dml program would be loaded and executed. The statement at 409 shows a default object DML which opens and executes OTDPS code. Default objects are discussed later.

Created classes are objects created explicitly using the inline Object function. For example, in the statement "CONN$Greenfield=Object Connection; or SAP$Inventory=Object SAP; Object function is called explicitly causing a connection object to be instantiated at that point in the code. This forces the OTDPS interpreter's factory to instantiate a connection object at parse time. Any object created by the Object function is instantiated immediately at parse time.

Default classes are objects that are created by default whenever the script is run. An example of default class or object is DML which is designated as DML$DML("ScriptName") and will load, execute an OTDPS script and terminate currently executing script. Another default object is URL$URL which allows access to URL variables and URL functions. For example, "var$test =URL$URL.encode("This Test")" will URL encode "This Test" and assign var$test with "This%20Test". Other examples of default objects described below are HTTP$HTTP, HTML$HTML, etc. FIG. 5 shows the results on a cell phone of the code in FIG. 4.

Figure 8:
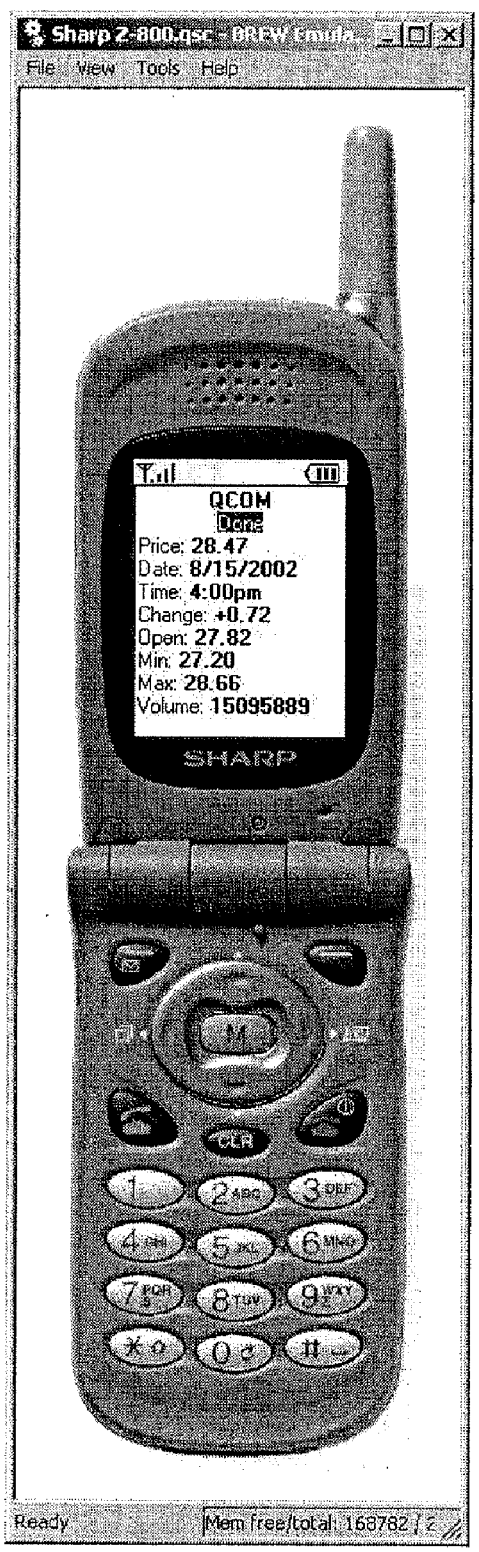
FIG. 8 shows the results displayed on the cell phone of the code shown in FIG. 6.

FIG. 6 at 601 shows the XML schema file shown in FIG. 7 being loaded into an XML object. The statement at 602 shows how nested method calls can be performed using OTDPS. The XML schema file is used to process the data returned from the HTTP object. When the dispatcher 303 invokes XML object bind method on the data returned from the HTTP object it knows from the XML schema to expect a sequence and therefore expects to parse and bind a list object or comma/tab delimited literal. The HTTP object returns a comma delimited literal and the names supplied in the schema file are binded to each value in the comma delimited list thereby making them available for access through the XML$StockInfo.<ElementName> mechanism. Note that the data is binded in sequence order as shown in FIG. 7. The statement at 603 shows a hyperlink that returns to a main menu. The statement at 604 shows that each late binded XML attribute can be accessed by simply and direct referencing. Here the price is shown using OTDPS xml$StockInfo.Price. FIG. 8 shows the results displayed on the cell phone of the code shown in FIG. 6. OTDPS allows an interpreter to communicate with the object factory 304 directly and can bypass the symbol table all together. Because the object's type is known at parse time, object creation can occur without first referencing the symbol table to determine a symbol type.

var$<variable identifying name> is a general purpose automatic variable. Assigning a value to a var$object creates a variable with a scope global to the entire execution. The var object is typecast at the time of assignment which means its type is dynamically binded when it is assigned a value. For example if it is assigned a string it becomes type string, if it is assigned an integer it becomes type integer. To determine the actual type of the var type variable, a lookup in the symbol table needs to be performed. Examples of the var$ variables include: Date$today="2000-06-01" and var$today= Date$today creates and/or sets a variable to today's date and stores it in the symbol table as a date object. Var$year=var$today.substr(0,4) creates and/or sets a variable to the year and stores it in the symbol table as a string; and var$Cnt=2 creates and/or sets variable to value 1 and stores it in the symbol table as an integer.

The delimiter not only separates the type from the symbol name but also describes the structure to which it is bound. If a reference is made to a single scalar type object such as a menu object, one can designate it as menu$mainMenu. Now, if there is an array of menus, one can create them using the Object function as follows: menu@mainMenu=Object Menu; and refer to a single menu in the array as menu$mainMenu[5].SetTitle. If there is a hash of menus and one desires to create them, the ODPTS of menu%mainMenu=Object Menu; can be used. A reference to a single menu can be made as follows: menu$mainMenu{Top}.SetTitle. Again in this embodiment, the Object function forces the interpreter to instantiate the object at parse time.

4. Expression Statement

Typical expression statements in the present invention may include: !var$flag, var$Cnt!=1, exists(ENV$DBQUERY), and var$count=URL$URL.count.

5. Statements

In one embodiment, the present invention includes singular statements as well as compound statements. An example of a singular statement is var$Cnt=1. A compound statement is a set of statements that may be combined into a single statement by enclosing the statements in braces. An example include {var$Cnt++; print(var$Cnt)}.

6. Control Logic 6.1 If . . . elseif . . . else

This clause executes selected statements when an expression evaluates to true. If no expression evaluates to true, a default set of statements under the else is executed. The elseif and else clauses are optional. Multiple elseif clauses may exist but only one else clause is allowed. For example:

if (expression) single-statement;
    elseif (expression) single-statement;
    elseif (expression) single-statement;
    else (expression) single-statement.

The compound statements may also be used in the above example in lieu of any one of the single-statements.

6.2 while

The while clause in the present invention executes a set of statements if an expression evaluates to true. The set of statements are executed repeatedly until the expression evaluates to false. The block of code between the {start bracket and} stop bracket are executed until the expression is evaluated false. For example:

while (expression) {statement; statement;}. 6.3 do while

The do while clause in the present invention executes a set of statements at least once. If n expression evaluates to true, the set of statements are executed again. The block of code between the {start bracket and} stop bracket are executed until the expression is evaluated false. For example:

do {statement; statement;} while (expression).

6.4 for

The for clause in the present invention is shorthand for a typical while loop. It creates a loop that has one or more, preferably, three option expressions enclosed in parentheses and separated by semicolons. The block of code between the {start bracket and} stop bracket are executed until the test condition is evaluated false. For example:

for (initialize; test; increment) {statement; statement; }.

6.5 label <LabelName>:

The labels in the present invention enable statements, code segments, loops, and branch points to be identified by name. Each label name must be followed by a colon.

6.6 exit <labelname>;

The exit statement followed by a label in the present invention enables a control to exit a loop such as while, do-while, and for statements, and immediately to execute the next statement following the close of the loop clause. If no label follows the exit statement, then the current loop is exited. For example,

```
while (var$loop1<0)
{ var$loop1++;
    if (var$loop1 == 5) exit;
}
```

Another example may be,

```
loop1: while (var$loop1 < 5)
{ var$loop1++; var$loop2=0;
    loop2: while (var$loop2 < 5)
    { var$loop2++; var$loop3=0;
        loop3: while (var$loop3 < 5)
        { var$loop3++;
            if (var$loop3 == 2) exit loop1;
            var$Cnt++;
        }
    }
}
```

6.7 continue <labelname>;

The continue statement in the present invention enables program control to exit a loop such as while, do-while, and for clauses, and immediately begin the next iteration of the same loop. Labels may be used to specify which loop when working with nested loops. When a continue statement is encountered, the execution of the subsequent code within a loop is skipped and program control is returned to the beginning of the loop to begin execution of next iteration. If no label follows the continue statement, then the current loop is used as a default loop. For example,

```
while (var$loop < 10)
{ var$loop1++;
    if (var$loop1 > 5) continue;
    var$Cnt++;
}
loop1: while (var$loop1 < 5)
    { var$loop1++; var$loop2=0;
        loop2: while (var$loop2 < 5)
        { var$loop2++; var$loop3=0;
            loop3: while (var$loop3 < 5)
            { var$loop3++;
                if (var$loop3 == 2) continue loop2;
                var$Cnt++;
            }
        }
    }
```

6.8 end;

The end statement in the present invention immediately releases resources and terminates the program. The end of the life of the program occurs when this term is parsed by the OTDPS interpreter or the script ends, which ever comes first. Once the resources are released the OTDPS interpreter is terminated and control is passed back to the operating system.

7 Operators

Table 1 includes assignment operators used in one embodiment of the present invention.

TABLE 1

| | | Operators | |
|---|---|---|---|
| = | Assignment | X=0<br>Y=X=2 | Assigns a value to a variable |
| ++ | Increment | x=2; ++x (returns 3, x==3) | Decrements operand by one and returns new value (++i) or the old value (i++) |
| −− | Decrement | x=2; −−x (returns 1, x==1)<br>x=2; x−− (returns 2, x==1) | Decrements operand by one and returns new value (−−i) or the old value (i−−) |

TABLE 1-continued

Operators

| | | | |
|---|---|---|---|
| + | Addition | x=2;y=3;x+y (returns 5) | Adds two operands and returns sum (i+y) |
| | String Concatenate | "str1"+"str2" (returns "strstr2") | Concatenates two strings ("str1"+"str2") |
| − | Subtraction | x=3;y=2;x−y (returns 1) | Substracts two operands and returns difference (i−y) |
| | Unary Negation | x=3;−x(returns −3) | Converts positive operands to negative (−i) |
| * | Multiplication | 5*2 (returns 10) | Multiplies two operands and returns result (i*y) |
| / | Division | 15/5 (returns 3) | Divides two operands and returns result (i/y) |
| % | Modulo | 15.3%5 (returns 0.3) | Divides two operands and returns remainder (i%y) |
| & | Bitwise AND | 7 &2 (returns 2) | Bits different are set to 0 |
| \| | Bitwise OR | 4 \| 1 (returns 5) | Bits different are set to 1 |
| ^ | Bitswise XOR | 3 ^ 2 (returns 1) | Bits different are set to 1, all other set to 0 |
| ~ | Bitwise NOT | ~5 (returns −4) | Bits are reversed from their original value (ones compliment) |
| && | Logical AND | (1==1) &&(2==2) (returns true) (1==1) &&(2==3) (returns false) | Returns a Boolean value and the operand expressions are evaluated as Boolean expressions. True only if both operands evaluate to True, otherwise false |
| \|\| | Logical OR | (1==1) \|\| (2==3) (returns true) (1==2) \|\| (2==3) (returns false) | Returns a Boolean value and the operand expressions are evaluated as Boolean expressions. True only if both operands evaluate to True, otherwise false |
| ! | Logical NOT | !(1==1) (returns false) | Inverts the Boolean value of the expression evaluated |
| == | Equality | 5==5(returns true) 5==4(returns false) | True only if operands are the same value |
| != | Inequality | 5!=5(returns false) 5!=4(returns true) | True only if operands are NOT the same value |
| < | Less than | 5<5 (returns false) "4" < "5" (returns true) | True if first operand is less than the second operand |
| <= | Less than or equal | 5.1 <= 5 (returns false) 5 <= 5 (returns true) "4" <= "5" (returns true) | True if first operand is less than or equal to the second operand |
| > | Greater than | 5 > 5 (returns false) "5" > "4" (returns true) | True if first operand is greater than the second operand |
| >= | Greater than or equal | 5.1 >= 5 (returns true) 5 >= 5 (returns false) 5" >= "4" (returns true) | True if first operand is greater than or equal to the second operand |

TABLE 1-continued

| | | Operators | |
|---|---|---|---|
| [ ] | Array index | URL$Name[var$Cnt].value | Allows access to individual elements of an array. Zero is the first element. |
| { } | Hash index | URL$Name{Id}.value | Access Hash elements |

7.1 Assignment Shorthand

In one embodiment, the present invention also may include shorthand assignment operator notations. For example, combinations of the assignment operator and other operators may be written in shorthand notation as shown in Table 2. Table 2 lists the operators or the present invention in one embodiment.

TABLE 2

| | |
|---|---|
| x+=y | x=x+y |
| x−=y | x=x−y |
| x*=y | x=x*y |
| x/=y | x=x/y |
| x%=y | x=x%y |
| x&=y | x=x&y |
| X^=Y | x=x^y |
| x\|=y | x=x\|y |
| <<= | x=x<<y |
| >>= | x=x>>y |

8 Functions

Functions include calls that do not use "variable type declaration prefix" notation, e.g., VAR$string.length( ).

8.1 nbsb (<mode>)

| <mode> | 1 = turn on, 0 = turn off |
|---|---|
| <returns> | none | nbsb in one embodiment of the present invention represents a none breaking space mode. If this mode turned on, NULL characters, e.g., returned from a database query results, may be automatically replaced by " ". This automatic replacement method is useful when populating cells in a web page table.

8.2 print (<format>, <variable list>)

| <format> | standard "C" printf format string |
|---|---|
| <variable list> | set of optional variables separated by commas, for example |
| <returns> | formatted string |

The print function in the present invention sends a formatted string to standard output. The string may be created using the same format notation used for the printf in standard ANSI C. Examples include: print (Count Integer: %d\n", DB$cnt); print ("Float: %6.3f\n" var$floatVal);

8.3 sprint (<format>, <variable list>)

| <format> | standard C printf format string |
|---|---|
| <variable list> | set of optional variable, may be separated by commas |
| <returns> | formatted string |

The sprint of the present invention returns a formatted string, which may be created using the same format notation used for the sprint function in standard ANSI C. Example include: var$Str1=sprint ("count Integer: %d\n", DB$cnt); var$Str2=sprint ("Float: %6.3f\n", var$floatVal).

8.4 exists (<object>)

| <object> | any object |
|---|---|
| <returns> | true if the object exists, otherwise returns false |

The exists function determines whether an object has been created. Example of a code using the exists statement is: if (exists(CURSOR$CharityDeductions)) . . . .

8.5 errorMode (<mode>)

| <mode> | 1 = turn on, 0 = turn off |
|---|---|
| <returns> | none |

The errorMode function sets ODBC to report errors verbosely and end program execution upon an occurrence of an error. An example usage of the errorMode is: errorMode(1).

8.6 alert (<text message>)

| <text message> | a printable text string |
|---|---|
| <returns> | none |

The alert function causes a message to be displayed within a standard JAVASCRIPT dialog box. The dialog remains until the user responds by clicking on the "OK" button. An example usage of the alert function is: alert ("An error has ocurred\n"+"Please click on OK below to continue");

8.7 Subroutines sub$name(parameterList)

| { OTDPS code ... |
|---|
| } |

Subroutines can be called by using the syntax, sub$name (parameterList), where the type is sub and the name is the programmer assigned name of the subroutine along with its associated parameters. Parameters are optional. Each parameter passed is binded to the supplied parameter list. Type checking is performed during binding allowing multiple subroutines with the same name to have different parameter types for subroutine overloading. For example, that can be three subroutines as follows:

Sub$setInfo(int$id,string$name)

```
{ PeopleSoft$person.setId{string$name} = int$id;
}
Sub$setInfo(int$id,int$age,string$name)
{ PeopleSoft$person.setId{string$name} = int$id;
   PeopleSoft$person.setAge{string$name} = int$age;
}
Sub$setInfo(string$name,int$id)
{ SAP$item.setId{string$name} = int$id;
}
```

Note that third party objects, in this case PeopleSoft or SAP objects, can be supplied and plugged into the OTDPS interpreter so that it knows how to manufacture and dispatch each type of object.

If sub$setInfo(10,"Bruce") is called, the first subroutine is called, which sets the PeopleSoft$person{Bruce}.id=10. If sub$setInfo("Plate",142534) is called, the third subroutine is called, which sets the SAP$item{Plate}.id=142534.

8.8 Inline Objects

```
Object <ObjectName>
{ OTDPS code...
}
```

In one embodiment, objects are defined inline by using the Object name syntax. Inline objects are mapped into the Object Factory 304 object creation table at parse time and have a UID assign to the name supplied. For example the code segment below creates a object named Button and stores the properties and methods defined in a structure that when invoked will produce a button object instantiation. That structure is then binded to the name Button and a unique identifier (UID) is created and mapped to that structure in the object factory object creation table. That UID and symbol name Button is then passed to the Dispatcher 303 and mapped into its object hash table for future reference. Note that the dispatcher does not place the symbol name Button into the symbol table because that is not necessary until the object factory instantiates one.

Object Button

```
{ self$color = gray; //set default color to gray
   self$Style = rectangle;
   HTML$HTML.onClick = "location.href = 'http: // www . uspto . gov'";
}
```

In the above http reference example, a person of ordinary skill will know that the correct syntax for reference a www or http site is without the blank spaces.

Now a button object can be created by simply typing button$myButton.color=blue;
button$myButton.onClick="location.href='http://www.dynascript.com'";

In one embodiment, one can override the default color and onClick values by reassigning the onClick property. The interpreter automatically reassigns the new onClick property to the internal HTML object because it is the only object that has an onClick property. When the dispatcher 303 receives the onClick method token it evaluates the instantiated button object and checks to see if it has an onClick property and assigns it.

8.8 Language Object

<LanguageName>$<Object Name>.parse(<FileName>); or <LanguageName>$<Object Name>.<MethodName>(<Parameter>);

The language object can also be used to communicate with other protocols and interfaces. For example, PERL$PriceLookup.parse("price.pl") would load a PERL interpreter and load the supplied file into it and execute the PERL code. In another example, a JAVA language object could be created. JAVA$TableSearch.parse("TableSearch.jar") would load a JAVA interpreter and load the supplied file into it and execute. The dispatcher 303 would also allow the PERL interpreter access to the OTDPS symbol table to pass data between them. It would map the language object name to the instance, generated by the object factory 304, in the symbol table. Other examples are a COM object COM$EntryForm.load( ) that could be created to communicate with an OCX control. A VISUAL BASIC object VB$Target.display(var$position) could be created to load a program and pass it data from the symbol table. Lastly 3rd party objects can be created to interface with their programs. Even database applications like PeopleSoft and SAP could be created to interface with large applications like this: PeopleSoft$Employee.getStartDate ("EmployeeID=12579"). The Object factory 304 when handed a PeopleSoft UID from the dispatcher 303 would create a PeopleSoft interface object with all the required connectivity and methods. Then the dispatcher would call the supplied method token's method getStartDate and return the supplied employee's start date. In one embodiment, it is totally transparent to the programmer how the interface actually works. Third party companies would supply plugin modules that would tie into the OTDPS object factory 304 and produce interfaces to their respective applications.

9 Environment Object

ENV$<VariableName> The environment object type is generated by default at the start of a program execution. An ENV$ object may be created for each environment variable currently defined in the OS environment, e.g., DOS, Windows, UNIX. A typical format is ENV$<name of environment variable> An example of a code using the environment object is: if (exist (ENV$REMOTE_USER)) var$str=ENV$REMOTE_USER. At runtime the OTDPS interpreter automatically passes the ENV UID to the object factory and calls its init method. This forces the ENV object to copy all of the available environment variables from the system's environment table into its internal structure for access via the ENV$<VariableName> mechanism.

9.1 Standard Environment Variables

Table 3 shows a list of standard environment variables supported in the present invention. Column 1 lists an operating system environment variable name, column 2 describes the variable, and column 3 list the variable name as used in the present invention.

TABLE 3

| Operating system environment variable name | Description | Script variable name |
|---|---|---|
| GATEWAY_INTERFACE | The revision of the CGI that the server uses | ENV$GATEWAY_INTERFACE |
| SERVER_NAME | The server's hostname or IP address | ENV$SERVER_NAME |
| SERVER_SOFTWARE | The name and version of the server software that is answering the client request | ENV$SERVER_SOFTWARE |
| SERVER_PROTOCOL | The name and revision of the information protocol the request came with | ENV$SERVER_PROTOCOL |
| SERVER_PORT | The port number of the host on which the server is running | ENV$SERVER_PORT |
| REQUEST_METHOD | The method with which the information request was issued | ENV$REQUEST_METHOD |
| PATH_INFO | Extra path information passed to a CGI program | ENV$PATH_INFO |
| PATH_TRANSLATED | The translated version of the path given by the variable PATH_INFO | ENV$PATH_TRANSLATED |
| SCRIPT_NAME | The virtual path (e.g. /cgi-bin/program.pl) of the script being executed | ENV$SCRIPT_NAME |
| DOCUMENT_ROOT | The directory from which web documents are served | ENV$DOCUMENT_ROOT |
| QUERY_STRING | The query information passed to a program. It is appended to the URL with a "?" | ENV$QUERY_STRING |
| REMOTE_HOST | The remote hostname of the user making the request | ENV$REMOTE_HOST |
| REMOTE_ADDR | The remote IP address of the user making the request | ENV$REMOTE_ADDR |
| AUTH_TYPE | The authentication method used to validate a user | ENV$AUTH_TYPE |
| REMOTE_USER | The authentication name of the user | ENV$REMOTE_USER |
| REMOTE_IDENT | The user making the request. This variable is only be set if NCSA Identity Check flag is enabled, and the client machine support the RFC 931 identification scheme (ident daemon) | ENV$REMOTE_IDENT |
| CONTENT_TYPE | The MIME type of the query data, such as "text/html" | ENV$CONTENT_TYPE |
| CONTENT_LENGTH | The length of the data (in bytes or the number of characters) passed to the CGI program through standard input | ENV$CONTENT_LENGTH |
| HTTP_FROM | The email address of the user making the request. Most browsers do not support this variable | ENV$HTTP_FROM |
| HTTP_ACCEPT | A list of the MIME types that the client can accept | ENV$HTTP_ACCEPT |
| HTTP_USER_AGENT | The browser the client is using to issue the request | ENV$HTTP_USER_AGENT |
| HTTP_REFERE | The URL of the document that the client points to before accessing the CGI program | ENV$HTTP_REFERER | other environment variable may also be included

10 URL Object

Uniform resource locator ("URL") objects are created from a calling page. For example, Object URL may be created to synthesize URL variables. URL objects typically have string type data structure. An example usage of a URL object in the present invention is URL$<URL identifier>. An example of a code using the URL object includes URL$myURL=Object URL;

10.1 Default URL object

URL$URL

URL$URL is a URL$ object representing a reserved symbol. Properties of URL$URL are described below.

URL$URL.length returns the number of key-value pairs in the URL$URL object. URL$URL.query returns the un-decoded URL query string. URL$URLname [<index>] returns the name of key-value pair name found at index location. <index> may be an integer index value with first element=0. The URLname method returns a string value. Examples of use include var$KeyName1=URL$URL[0].name; and var$KeyName2=URL$URL[1].name.

URL$URLvalue [<index>] returns the value of key-value pair found at index location. <index> may be an integer index value with first element=0. The URLname method returns a string or numeric value. Examples of use include var$KeyValue1=URL$URL[0].value; and var$KeyValue2=URL$URL[1].value.

URL$URL.encode (<un-encode string>) method returns a URL encoded string. <un-encode string> is a string. An example of use include var$myEncodedString=URL$URL.encode(var$aString).

URL$URL.decode (<URL string>) method returns a decoded URL string. <URL string> is a URL string which needs to be decoded. An example of the method call includes: var$decodedQuery=URL$URL.decode(URL$URL.query).

URL$URL.encrypt (<string to encrypt>) method returns a string which has been encrypted. <string to encrypt> is a literal string or string variable. This method is useful in enabling secure communication of strings. Examples of use include: var$mycypherstring=URL$URL.encrypt(var$myPlainString); and var$u="http://www.dynascipt.com?Name="+URL$URL.encrypt(var$Val).

URL$URL.decrypt (<string to decrypt>) method returns a string translated back into readable characters. The string may have been originally generated by the encrypt method. <string to decrypt> is a literal string or string variable in an encrypted format. An example of use of the method include: var$myPlainstring=URL$URL.decrypt(var$myCypherString).

URL$URLvalidate ([<URL>]) method returns true if the supplied URL is a properly formed URL. <URL> is a URL string. An example of use of the method include: if (URL$URL.validate (var$UsersURL)).

URL$<VariableName> property directly accesses the URL variable by name. At runtime if a URL query is available via the ENV$QUERY_STRING, the OTDPS interpreter automatically calls the object factory with a URL object UID and creates a URL object. It then calls the URL object parse method and passes in the ENV$QUERY_STRING. That causes the URL object to bind each URL parameter name with its respective value and makes it available to the URL object mechanism as well as accessible through the URL$<VariableName> syntax. If multiple variable are passed with the same name they can be accessed using the following syntax: URL$<VariableName>[Index]. The total number of values assigned can be accessed with the following syntax: URL$<VariableName>.count. All URL variables can use the string methods because they are internally stored as strings. For example URL$zip.substr(0,5) is valid syntax.

10.2 Value

| | |
|---|---|
| <parameters> | none |
| <returns> | string |

The value function returns the value of the corresponding name. Multiple values may be passed for the same name, therefore, an index may be used to access each value. Examples of statements using the value function include: var$KeyValue=URL$KeyName.value; var$KeyValue1=URL$KeyName[0].value; var$Keyvalue2=URL$KeyName[1].value.

10.3 length

| | |
|---|---|
| <parameter> | none |
| <returns> | integer value |

The length function returns the number of values associated with a key name. Examples include: var$elements=URL$KeyName.length.

11 HTML Object

11.1 Default HTML Object

The HTML$HTML object may be created by default when a program is executed. In one embodiment of the present invention, it is a reserved symbol.

The HTML$ object includes header, redirect and encode functions. For example, HTML$HTML.header [<header spec>] method outputs an HTML header needed at the beginning of all HTML pages. <header spec> specifies an optional, specific type of header whose default is a standard HTML header. The method returns nothing. This method is automatically evoked if the script starts outputting without sending an HTML header. Example usage includes: HTML$HTML.header ( ) and HTML$HTML.header('text/plain').

The HTML$HTML.redirect (<URL>) method directs the users browser to retrieve an HTML page from another URL. <URL> represents a fully declared URL. The method returns nothing. Example usage includes: HTML$HTML.redirect ('http://www.dynascript.com').

The HTML$HTML.encode (<string to encode>) method outputs a HTML encode string. <string to encode> is a literal string or string variable to be HTML encoded. The method returns nothing. Example usage includes: var$mystring=HTML$HTML.encode (var$HtmlString). If var$htmlString contained "<id>" var$myString would be assigned "<id>";

12 Date Object

The date object, DATE$<date identifier>, includes datetime information and methods. Example usage includes Date$lastUpdate=Object Datetime;. Its internal format may be represented as follows: yyyy-MM-dd hh:mm:ss.sss in US date style and 24 hour clock; 2000-04-15 23:59:59.012 which represents April 15th at the last second. The methods listed in Table 4 may be applied to the Date$object.

TABLE 4

| | | |
|---|---|---|
| getYear( ) | setYear(1999) | Four digit year (1999) |
| getMonth | setMonth(11) | Month(01–12) |
| getDate( ) | setDate('05/21/1999') | Date(<US style Date>) |

TABLE 4-continued

| | | |
|---|---|---|
| getHours( ) | setHours( ) | Hours (24 Hour Style) |
| getMinutes( ) | setMinutes( ) | Minutes (00–60) |
| getSeconds | setSeconds | Seconds(00.000–60.000) |
| getTimeZone( ) | setTimeZone( ) | TimeZone Hours Offset from GMT (0, +/−01.0 to 12.0) (defaults to system TZ) |
| getDay( ) | | Day of the week (0 = Sun, 6 = Sat) |

12.1 DateTime Set & Get Method Summary

The format(<pattern>) method converts a DateTime object into a formatted string. <pattern> is a date format string. The method returns character string version of date. The returned string may be assigned to any string variable. Examples inlcude: var$Date=DATE$myDate.format("MM/dd/yy") where "MM/dd/yy" represent date having a form, 05/10/99, for example. <pattern> also may include "yyyy-MM-dd HH:mm:ss.sss" representing 1999-05-10 13:50:43.567 format, "hh:mm" representing 01:50 PM, "dd-MON-yy" representing 10-MAY-99, and "DAY MON dd,yyyy" representing Mon MAY 10, 1999. Table 5 includes a list of exemplary date formats in the present invention.

TABLE 5

| Type | Pattern | Example |
|---|---|---|
| Year | yyyy | 1999, 2000, 2001, . . . |
| Month | MM | 01 . . . 12 |
| | MON | 'Jan' . . . 'Dec' |
| Date | MM/dd/yyyy | setDate(01–12/01–31/1999–) |
| Day | DAY day | day('Sun', 'Mon', 'Tue', . . . ) |
| Hour | hh HH | 12 hour(01–12 AM/PM) |
| Minute | mm | minutes (00–59) |
| seconds | ss | 2 digit seconds (00–59) |
| Milliseconds | .sss | 3 digit milliseconds (000–999) |

13 String Object

The string object in the present invention applies to character strings. The functions for operating on character strings are described below.

13.1 substr (<start position>, [<length>])

The substr method extracts a substring from a string. <start position> may be an integer. For example, 0 represents a first character, and −1 represents a first character from the end of the string. <length> is a number of characters to extract. The default is the to the end of the string. Example usage includes: var$string.substr(0,4) and var$string.substr(0,var$cnt).

13.2 indexOf (<substring>,[<start>])

This method returns the starting location of a substring within a string. <substring> may be a single character, string, or string variable. <start> in an integer value indicating the starting point. For example, 0 represents first character, and −1 represents last character. The method returns an integer value of starting index position of substring in string. For example, 0 represents first position, and −1 represents string not found. Example usage includes: var$index=var$string.indexOf ('test').

13.3 trim (<string>)

This method removes leading and trailing spaces. It is typically intended for use with SQL queries, which may have additional spaces returned in the results. <string> is a string. The method returns a string. Example usage includes var$trimmed=trim (DB$name).

13.4 length

This method returns the character count of the string object. The returned value is an integer length.

14 ODBC Database Object and Methods 14.1 Single Connection, Single Cursor

When only a single cursor is necessary, a simple syntax using the default connection CONN$CONN and default cursor object CURSOR$CURSOR may be used implicitly. In this case, the syntax appears more traditional C-like function calls. FIG. 9 illustrates an example. Another aspect of the single connection approach is that SQL statements 901 may be inserted into the script directly and need not be enclosed within a method call, for example, prepare( ). The bindparam, execute, and fetch methods of the default cursor may be invoked without an object declaration as well. Below is an example of the equivalent code being processed by the OTDPS interpreter. Note that the conn$conn and cursor$cursor objects are implicitly implied and implemented.

conn$conn.connect("DSN=Greenfield;UID=webuser; PWD=admin");
//Free SQL Statement example
cursor$cursor=conn$conn.prepare("select tax_desc from tax_info where tax_id=?");
cursor$cursor.bindParam(SQL_param_input,URL$TaxId, SQL_varchar);
curser$cursor.fetch( );
print("Your Being Taxed because %s\n",DB$tax_desc);

All database objects or variables can be directly accessed using a simple DB$<database fieldname> mechanism. In FIG. 9 at 902, the database field of the SQL select statement tax_desc can be directly accessed using OTDPS DB$tax_desc. As shown below with multiple connections, if using nested database fetches and each SQL query has a same field name in their respective queries there may be a name ambiguity problem in accessing both of them at the same time. In one embodiment, only the last fetched value will be stored in each respective variable name.

14.2 Multiple Cursors

Multiple cursors may be created and managed simultaneously. Each connection may also have multiple result sets returned, which may be managed with multiple cursors. FIG. 10 illustrates an example of code using the multiple cursors.

CONN$Greenfield.connect("DSN=Greenfield; UID=webuser;PWD=admin");
if (!CONN$Greenfield.connected){print("Unable to connect go Greenfield\n");end;}
CURSOR$owner=CONN$Greenfield.prepare("select name from owners");
CURSOR$address=CONN$Greenfield.prepare("select name, city, state, zip from address where owner='CURSOR$owner.name'");

FIG. 11 illustrates an example of code using the multiple cursors that have the same name fields. In this example, both owners and address table have a field labeled name and both cursors are nested within each other. The ambiguity of DB$name is resolved by referring to them via each respective cursor name using the CURSOR$<CursorName>.<FieldName> mechanism.

14.3 Database DB object DB$<Database name>

These variables include data that has been returned from a database. These objects have the format, DB$<FieldName>. They are available after a cursor fetch or execute has been performed. They are named after each field designator in the SQL query executed, for example, a SQL query "select name, addr, city, state, zip from client". Once the query has been executed the data returned is immediately available via DB$name, DB$addr, DB$city, DB$state, and DB$zip.

14.4 Connection Object

This variable represents a connection to a SQL server. Multiple database connections are allowed to be opened and queried simultaneously. The connection object has a format CONN$<connection identifier>. An example of code using the connection object include: CONN$Greenfield=Object Connection; CONN$Greenfield.connect(" DSN=Greenfield; UID=webuser; PWD=hodgepodge") forces instantiation or dynamically instantiates the connection object. Then a cursor can be associated with that connection as follows: CURSOR$MyCur=CONN$Greenfield.prepare
("select*from clientList").

14.4.1 Default Connection Object

The default connection object CONN$CONN may be created by default whenever a script is executed. This is the connection used when the single connection scripting style is used. When connection methods are called without a specific reference to a connection object, this default object is implied. Any CONN$ method may be invoked by calling the method as traditional function. For example, the OTDPS object function is not necessary and the call may be expressed as connect ("DSN=Greenfield;UID+webuser;PWD=hodgepodge") in place of CONN$CONN.connect ("DSN=Greenfield;UID+webuser;PWD=hodgepodge"). The CONN$CONN object is implicitly implied and implemented.

14.4.2 connect(<database access string>)

<database access string> may include a series of semicolon (;) separated key-value pairs which define various connection parameters. The order of the key-value pairs is not significant. Key-value pairs may include DSN which is ODBC data source name, UID which is a user login, and PWD which is a user password. <alternate access string> represents string that does not explicitly declare DSN, UID, and password. When a UID and PWD are not required, this string may include only the data source name in quotes, e.g., "Greenfield". The connect method returns a connected property. Examples include CONN$Greenfield.connect("DSN=Greenfield; UID=webuser; PWD=hodgepodge"); CONN$Greenfield. connect("Greenfield"); and connect("DSN=Greenfield; UID=webuser;PWD=hodgepodge").

14.4.3 connected

The connected method returns true if the connection is connected, and false if it is not. The return value is typically a boolean true or false. Example includes: if (!CONN$Greenfield.connected).

14.4.4 disconnect( )

The disconnect method disconnects a connection. Connections are automatically disconnected upon exit. An example of the method call includes: CONN$Greenfield. disconnect ( ).

14.4.5 prepare (<SQL statement>)

The prepare method creates a cursor that can execute the SQL statement. <SQL statement> may be a quoted string which includes a single SQL statement. The method returns a Cursor object. An example of use include CURSOR$TaxCnt=CONN$Greenfield.prepare ("select count(*) from tax_info").

14.4.6 do <SQL statement>

The do method performs a prepare and execute in one command. It expects a SQL statement to be passed as its parameter and will validate the SQL statement syntax. SQL statements that perform data inserts, updates or deletions use this command. <SQL statement> may include a quoted string which has a single SQL statement. This method returns a Cursor object. An example of use includes: CURSOR$Tax=CONN$Greenfield.do ("update tax_id set taxNo=1234 where SSN='123-45-6789'").

14.4.7 commit( )

The commit method records changes to the database made in previous SQL statements since the last commit( ) or since the opening of the connection. Following this call, changes up to this point are recorded. The changes may not be discarded using rollback( ) method. If a connection has multiple cursors defined, changes made by all of those associated cursors are recorded. An example of use includes: CONN$Greenfield. commit( ).

14.4.8 rollback( )

The rollback method discards any changes to the database made in the previous SQL statements since the last commit( ) or since the opening of the connection. If a connection has multiple cursors defined, changes made by all of those associated cursors are discarded. An example rollback( ) method call includes: CONN$Greenfield.rollback( ).

14.4.9 setattr(<connection_attribute>,[<optional parameter>, . . . ])

The setattr method is used to set the attributes of a connection. Parameters may be separated by comas. <connection_attribute> may be a standard ODBC attribute. <optional parameter> may include one or more optional parameters which are specific to the <connection_attribute>. An example of setattr method call includes: CONN$Greenfield.setattr ("SQL_attribute_autocommit_on"). 14.4.10 Connection Attributes The connection attributes include SQL_attribute_autocommit_on(default), SQL_attribute_autocommit_off, SQL_attribute_connection_timeout, SQL_attribute_login_timeout, SQL_attibute_trace. These attributes are typically defined by the ODBC standard.

14.5 Cursors

The Cursor object provides access to the results returned by an SQL query statement or function. Multiple cursor objects allow multiple results sets to be examined row by row simultaneously. This object has the following format: CURSOR$<cursor identifier>. Examples of use include: CURSOR$TaxId=CONN$Greenfield.prepare ("select paid from taxInfo"), and CURSOR$TaxId.execute( ). Each result set returned from a SQL select query are accessible via the cursor using the OTDPS CURSOR$<Cursor Name>.<FieldName>. So for the example above CURSOR-$TaxId.paid will return the data supplied by the cursor. 14.5.1 Default Cursor Object

CURSOR$CURSOR

This cursor object may created by default when a script is executed. This cursor may be used when retrieving results using the single connection scripting style. When cursor methods are called without a specific reference to a cursor object, this default object is implied. Examples of the method call include: select tax_Desc from tax_info where tax_id=1234567890; execute ( ); fetch (DB$tax_Desc). Any CURSOR$ methods may be invoked by calling the method as a traditional function. The object.method notation is not necessary. For example, fetch (DB$name) may be used in place of CURSOR$CURSOR.fetch (DB$name). The CURSOR-$CURSOR object is implicitly implied and implemented.

14.5.2 bindParam (<direction>,<script var>,<SQL param type>)

The bindParam method allows the cursor object to bind any variable to a parameter within the SQL statement. It generally is used to bind the arguments of stored procedure calls or select statements. The parameter is inserted in place of a "?" in the SQL statement. In one embodiment, a separate bindParam( ) call is needed for each "?" and they are associated in the order, that is, first ? associated with the first bindParam( ) call. <direction> specifies the direction of data flow for the parameter. SQL_param_input is a variable used to pass data into the database. SQL_param_output is a variable used to pass data back from the database. SQL_param_input_output is a variable used to pass data to and from the database. <script var> includes a variable, for example, URL$TaxId, var$myvar. <SQL param type> declares the SQL parameter type. An example of the bindparam call includes: Cursor$TaxId=CONN$Greenfield.prepare ("select tax_id from taxInfo where name_last=? and name_first=?"); Cursor$TaxId.bindParam (SQL_param_input, URL$LastNm, SQL_varchar); Cursor$TaxId.bindParam (SQL_param_input, URL$FirstNm, SQL_varchar). Table 6 includes standard SQL parameter types.

TABLE 6

| SQL_binginter | SQL_float | SQL_real |
|---|---|---|
| SQL_binary | SQL_int | SQL_smallint |
| SQL_bit | SQL_interval | SQL_timestamp |
| SQL_datetime | SQL_longbinary | SQL_tinyint |
| SQL_decimal | SQL_longvarchar | SQL_varbinary |
| SQL_double | SQL_numeric | SQL_varchar |

14.5.3 bindCol ([<col number>], <script var>,)

The bindCol method binds a script variable with a column returned in a result set. Columns are specifed by a number related to the order in which column values are returned. If the column number is excluded, each consecutive bindCol( ) is associated with the corresponding column of the result set. <column number> is an optional column number and <script var> is a script variable, e.g., URL$TaxId, to which to bind. An example of use includes Cursor$My.bindCol (1, var$lastUpdDate); and Cursor $My.bindCol (2, var$acctId).

14.5.4 setPos (<number>)

The setPos method sets the row position of a cursor pointing to a result set. This method may only be used if the SQL_attribute_scrollable attribute of the cursor has been turned on. The position within the result set is an absolute from either the first or last row. A positive number moves the cursor position forward and a negative number moves it backwards. An example of use includes: CURSOR$CharityDeductions.setpos(2) which moves cursor forward by 2 rows.

14.5.5 execute ( )

The execute method causes any previous SQL statements to be executed by the database server. An example of use includes select tax_desc from tax_info where tax_id=123456789; CURSOR$CURSOR.execute( ).

14.5.6 fetch (<DB vars>)

Each time fetch method is called, it returns values for a single row of a result set. The DB$ variables are assigned values in the order corresponding to the result columns, i.e., DB$arg1=colval1, DB$arg2=colval2, etc. If no variables are supplied variables are synthesized using the result set column names as the variables names. Examples of use include: CURSOR$TaxId=CONN$Greenfield.prepare ("select accountNo from taxInfo); while (CURSOR$TaxId.fetch( )) {var$cnt++; print(""%d, %s\n", var$cnt, DB$accountNo.substr(0,10));}. The database variable can be referenced explicitly by the cursor using the following OTDPS print (""%d, %s\n", var$cnt, CURSOR$TaxId.accountNo.substr (0,10)).

14.5.7 free( )

The free method releases the results data managed by the cursor object. A call to free occurs automatically when another prepare call is made. An example of a call to the method includes: CURSOR$CharityDeductions.free( ).

14.5.8 setattr(<connection_attribut>,<optional parameter>, . . . ) The seattr method is used to set the attributes of a cursor. Parameters may be separated by a comma. <connection_attribute> is a standard ODBC attribute, and <optional parameter> may include one or more optional parameters which are specific to the <connection_attribute>.

14.5.9 Cursor Attribute

Table 7 includes a list of cursor attributes. These attributes are defined by the ODBC Standard 3.0.

TABLE 7

| SQL_attribute_cursor_type | SQL_attribute_fetch_next |
|---|---|
| SQL_attribute_nonscrollable(default) | SQL_attribute_fetch_first |
| SQL_attribute_scrollable | SQL_attribute_fetch_last |
| SQL_attribute_forward_only (default) | SQL_attribute_fetch_prior |
| SQL_attribute_cursor_static | SQL_attribute_fetch_absolute |
| SQL_attribute_cursor_dynamic | SQL_attribute_fetch_relative |

15 DB Query Language

The present invention is enabled to support a subset of the standard SQL query language. These statements are those that are likely to need to access a database from within a script of the present invention.

15.1 Standard SQL Syntax Allowed

Table 8 includes the SQL syntax supported in the present invention.

TABLE 8

| Create a table | create table employee_list<br>( id_number int(10) not null,<br>lastname varchar(40) not null,<br>firstname varchar(40) not null,<br>phonenumberchar(12) null ) |
|---|---|
| Delete a table | drop table employee_list |
| Insert rows | insert into employee_list (id_number, lastname, firstname)<br>values ( 121212, "Abelson:, "Alice")<br>insert into employee_list (id_number, lastname, firstname)<br>values ( 232323, "Benson:, "Bart")<br>insert into employee_list (id_number, lastname, firstname)<br>values ( 343434, "Clarkson:, "Clyde") |
| Delete rows | delete from employee_list<br>where id_number = 343434 |
| Update rows | update employee_list<br>set phonenumber = "123-456-7890"<br>where lastnmae = "Ableson",<br>and firstname = "Alice" |
| Select from database | select * from employee_list<br>order by lastname, firstname |
| Execute a stored procedure | exec GetAreaCode, 123<br>or<br>BEGIN GetAreaCode (123) END; |

16 Debugging

In the present invention, setting the debug mode at the start of a script allows the developer to output information that is not normally available. Debugging output is written to a separate file, e.g., debug.txt, in the same directory as the scripts executable so that it does not affect the normal output of the script.

DEBUG$DEBUG

DEBUG$DEBUG object is created by default at the start of a script in the present invention. The mode method is used to enable and disable the scripts debugging features. The debug method has the following syntax: DEBUG$DEBUG.mode (<hexadecimal bit map>) where <hexadecimal bit map> is hexadecimal value (0xhhhhhhhh) where h is a hexadecimal digit (0-9, a-f). The hexadecimal values shown in Table 9 below may be combined or added into a single value.

TABLE 9

| | | |
|---|---|---|
| DEBUG_IO | 0x00000001 | Enable input and output of debugging information to debug.txt |
| not used | 0x00000002 | |
| not used | 0x00000004 | |
| not used | 0x00000008 | |
| DEBUG_ODBC | 0x00000010 | Set to dump ODBC commands |
| DEBUG_FETCH | 0x00000020 | Set to dump fetch variables |
| DEBUG_CALL | 0x00000040 | Set to dump procedure call variables |
| DEBUG_ASSIGNMENT | 0x00000080 | Set to dump all variable assignments |
| not used | 0x00000100 | |
| not used | 0x00000200 | |
| not used | 0x00000400 | |
| not used | 0x00000800 | |
| not used | 0x00001000 | |
| not used | 0x00002000 | |
| not used | 0x00004000 | |
| not used | 0x00008000 | |
| DEBUG_OUTPUT | 0x00010000 | Set to output debug data to client |
| DEBUG_FILE-APPEND | 0x00020000 | Set to output debug data to file in append mode |
| DEBUG_FILE_NEW | 0x00040000 | Set to output data to file in overwrite mode |
| DEBUG_PERSIST | 0x00080000 | Set to carry debug on to all other pages |
| not used | 0x00100000 | |
| not used | 0x00200000 | |
| not used | 0x00400000 | |
| not used | 0x00800000 | |
| not used | 0x01000000 | |
| not used | 0x02000000 | |
| not used | 0x04000000 | |
| not used | 0x08000000 | |
| not used | 0x10000000 | |
| DEBUG_AND_MASK | 0x20000000 | Set to AND out all lower non-set bits |
| DEBUG_OR_MASK | 0x40000000 | Set to OR in all lower bits |
| not used | 0x80000000 | |

While the invention has been particularly shown and described with respect to a preferred embodiment thereof, it will be understood by those skilled in the art that the foregoing and other changes in form and details may be made therein without departing from the spirit and scope of the invention.

I claim:

1. A program storage device readable by a machine, tangibly embodying a program of instructions executable by the machine to perform a method of implementing an object type-declaration syntax, comprising:

embedding a type declaration in a programming language within an object identifier as part of the object identifier;

using a joint attribute to delimit the type declaration from the object identifier, the joint attribute for determining a data structure of the object identifier;

including in the object identifier at least an object identifier and a method identifier, the method identifier being a method associated with the object identifier's type;

processing the object identifier in runtime, wherein the processing comprises:

determining a method to be invoked via the method identifier of the object identifier, said method being determined without referring to a class definition for the object identifier; and calling the determined method.

2. The program storage device of claim 1, wherein the embedding the type declaration includes embedding a type declaration in a programming language compiler within an object identifier.

3. The program storage device of claim 1, wherein the type declaration includes a language object type.

4. The program storage device of claim 1, wherein the type declaration includes a database object type.

5. The program storage device of claim 1, wherein the type declaration includes a connection database object type.

6. The program storage device of claim 1, wherein the type declaration includes a cursor database object type.

7. The program storage device of claim 1, wherein the type declaration includes a universal resource locator object type.

8. The program storage device of claim 1, wherein the type declaration includes an environment object type.

9. The program storage device of claim 1, wherein the type declaration includes a hypertext markup language object type.

10. The program storage device of claim 1, wherein the type declaration includes an extensible markup language object type.

11. The program storage device of claim 1, wherein the type declaration comprises an inline object type.

12. The program storage device of claim 1, wherein the joint attribute is concatenated to the object identifier.

13. The program storage device of claim 1, wherein the type declaration is concatenated to the joint attribute.

14. The program storage device of claim 1, wherein the object identifier includes dynamically evaluated expressions.

15. The program storage device of claim 1, wherein a compiler or interpreter of the programming language operates on an object declared in the type declaration without an explicit call to construct the object.

16. The program storage device of claim 1, wherein a compiler or interpreter of the programming language automatically instantiates an object being declared in the type declaration when the type declaration embedded with the object identifier is first read by the programming language compiler or interpreter.

17. The program storage device of claim 1, wherein the type declaration includes a subroutine object type.

18. The program storage device of claim 1, further comprising determining when the object identified by the object identifier is to be instantiated, wherein the determining comprises determining whether the instantiation is to be performed at parse time or delayed.

19. The program storage device of claim 18, wherein the instantiation is delayed, and further comprising storing the object in one of a flyweight or stand-in object to be used later.

20. The program storage device of claim 19, further comprising using the flyweight or stand-in object in response to calling activate method.

21. The program storage device of claim 1, further comprising creating an object identified by the object identifier, wherein the object is created by default or by object type declarations.

22. The program storage device of claim 21, wherein the object is a debug object created by default, said debug object enabling debugging.

23. A program storage device readable by a machine, tangibly embodying a program of instructions to perform a method, said method comprising:
    obtaining an object symbol, said object symbol comprising a type declaration, an object identifier and a method identifier, the type declaration and object identifier being delineated by a predefined symbol, said predefined symbol used to determine a data structure of the object identifier, and said method identifier identifying a method associated with the object identifier's type; and
    processing the obtained object symbol at runtime, wherein the processing invokes the method identified by the method identifier of the object symbol, and wherein the method identifier is appended to the object identifier, and wherein the processing of the obtained object symbol determines the method to be invoked without resorting to one or more class definitions of an object identified by the object identifier.

24. A method of implementing an object type-declaration syntax, comprising:
    embedding a type declaration in a programming language within an object identifier as part of the object identifier;
    using a joint attribute to delimit the type declaration from the object identifier, the joint attribute for determining a data structure of the object identifier;
    including in the object identifier at least an object identifier and a method identifier, the method identifier being a method associated with the object identifier's type;
    processing the object identifier in runtime, wherein the processing comprises:
        determining a method to be invoked via the method identifier of the object identifier, said method being determined without referring to a class definition for the object identifier; and
        calling the determined method.

25. The method of claim 24, further comprising determining when the object identified by the object identifier is to be instantiated, wherein the determining comprises determining whether the instantiation is to be performed at parse time or delayed.

26. The method of claim 25, wherein the instantiation is delayed, and further comprising storing the object in one of a flyweight or stand-in object to be used later.

27. The method of claim 26, further comprising using the flyweight or stand-in object in response to calling activate method.

28. The method of claim 24, further comprising creating an object identified by the object identifier, wherein the object is created by default or by object type declarations.

29. The method of claim 28, wherein the object is a debug object created by default, said debug object enabling debugging.

30. The method of claim 24, wherein a compiler or interpreter of the programming language operates on an object declared in the type declaration without an explicit call to construct the object.

31. A method comprising:
    obtaining an object symbol, said object symbol comprising a type declaration, an object identifier and a method identifier, the type declaration and object identifier being delineated by a predefined symbol, said predefined symbol used to determine a data structure of the object identifier, and said method identifier identifying a method associated with the object identifier's type; and
    processing the obtained object symbol at runtime, wherein the processing invokes the method identified by the method identifier of the object symbol, and wherein the method identifier is appended to the object identifier, and wherein the processing of the obtained object symbol determines the method to be invoked without resorting to one or more class definitions of an object identified by the object identifier.

* * * * *